(12) United States Patent
Benisty et al.

(10) Patent No.: US 12,175,281 B2
(45) Date of Patent: Dec. 24, 2024

(54) PCIe TLP SIZE AND ALIGNMENT MANAGEMENT

(71) Applicant: Western Digital Technologies, Inc., San Jose, CA (US)

(72) Inventors: Shay Benisty, Beer Sheva (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 290 days.

(21) Appl. No.: 17/569,362

(22) Filed: Jan. 5, 2022

(65) Prior Publication Data

US 2023/0214254 A1    Jul. 6, 2023

(51) Int. Cl.
*G06F 12/00*    (2006.01)
*G06F 9/46*    (2006.01)
*G06F 12/109*    (2016.01)
*G06F 13/16*    (2006.01)

(52) U.S. Cl.
CPC ............ *G06F 9/467* (2013.01); *G06F 12/109* (2013.01); *G06F 13/1668* (2013.01); *G06F 2212/603* (2013.01)

(58) Field of Classification Search
CPC ........ G06F 9/467; G06F 12/00; G06F 12/109; G06F 13/00; G06F 13/1668
See application file for complete search history.

(56) References Cited

U.S. PATENT DOCUMENTS

| | | | |
|---|---|---|---|
| 6,708,258 B1 * | 3/2004 | Potter | G06F 13/385 711/155 |
| 7,913,024 B2 | 3/2011 | Brown et al. | |
| 8,171,230 B2 | 5/2012 | Freimuth et al. | |
| 9,304,690 B2 | 4/2016 | McCambridge et al. | |
| 9,563,382 B2 | 2/2017 | Hahn et al. | |
| 9,798,636 B2 | 10/2017 | Breakstone et al. | |
| 9,811,258 B2 | 11/2017 | Galbo et al. | |
| 10,031,857 B2 | 7/2018 | Menachem et al. | |
| 10,120,832 B2 | 11/2018 | Raindel et al. | |
| 10,318,164 B2 | 6/2019 | De | |
| 10,564,857 B2 | 2/2020 | Benisty et al. | |
| 10,599,591 B2 | 3/2020 | Lee et al. | |
| 10,712,949 B2 | 7/2020 | Hahn et al. | |
| 10,732,895 B2 | 8/2020 | Earhart et al. | |

(Continued)

FOREIGN PATENT DOCUMENTS

KR    20160087224 A    7/2016

OTHER PUBLICATIONS

International Search Report and Written Opinion for International Application No. PCT/US2022/029738 dated Oct. 4, 2022.

*Primary Examiner* — Tuan V Thai
(74) *Attorney, Agent, or Firm* — PATTERSON + SHERIDAN, LLP

(57) ABSTRACT

A data storage device includes a memory device and a controller coupled to the memory device. The controller is configured to issue an unaligned transaction, determine that there is a transfer failure indication for the unaligned transaction, and retry the unaligned transaction with either a different alignment or a different transfer size. The different alignment or the different transfer size is used for another unaligned transaction from a same address range upon successful retry of the unaligned transaction.

20 Claims, 6 Drawing Sheets

(56) References Cited

U.S. PATENT DOCUMENTS

| | | |
|---|---|---|
| 10,740,000 B2 | 8/2020 | Benisty |
| 10,877,913 B2 | 12/2020 | Elkington et al. |
| 2010/0153611 A1 | 6/2010 | Rau |
| 2010/0165874 A1 | 7/2010 | Brown et al. |
| 2012/0317394 A1* | 12/2012 | Zhu .......................... G06F 8/44 |
| | | 711/E12.001 |
| 2016/0147442 A1 | 5/2016 | Baderdinni et al. |
| 2018/0373656 A1 | 12/2018 | Kuwabara et al. |
| 2019/0286363 A1 | 9/2019 | Benisty et al. |
| 2021/0124692 A1 | 4/2021 | Benisty et al. |
| 2021/0209030 A1 | 7/2021 | Gorrle et al. |
| 2021/0240641 A1 | 8/2021 | Benisty |
| 2022/0416997 A1* | 12/2022 | Dewan ................... G06F 21/602 |

\* cited by examiner

PCIe TLP SIZE AND ALIGNMENT MANAGEMENT

BACKGROUND OF THE DISCLOSURE

Field of the Disclosure

Embodiments of the present disclosure generally relate to data storage devices, such as solid state drives (SSDs), and, more specifically, aligning unaligned transactions.

Description of the Related Art

In non-volatile memory (NVM) express (NVMe) over peripheral component interconnect (PCI) express (PCIe) protocol, a data storage device acts as a bus master. As part of the protocol, the data storage device receives read commands and write commands from a host device. Data transfers are typically aligned to a host DRAM line in order to optimize the performance and avoid read-modify-write operations. A maximum transfer layer packet (TLP) size is advertised to the host device, where the data storage device retrieves data and commands in the TLP size from the host device in order to maintain a TLP alignment.

However, not all transfers may be in the max TLP size or aligned to a host DRAM line. Access alignment may be determined by the host device, but may not always be optimal for a target memory location because the NVMe protocol and the PCIe protocol operates at different layers of a protocol stack. In some examples, the requested size and alignment of a specific command payload may not be supported by or ideal for the host device. When transfers are not aligned to a host DRAM line size, the data may no longer be aligned with the TLP alignment boundaries. Thus, failures and/or performance loss may result from unaligned transactions being transferred.

Therefore, there is a need in the art for an improved method of aligning unaligned transactions.

SUMMARY OF THE DISCLOSURE

The present disclosure generally relates to data storage devices, such as solid state drives (SSDs), and, more specifically, aligning unaligned transactions. A data storage device includes a memory device and a controller coupled to the memory device. The controller is configured to issue an unaligned transaction, determine that there is a transfer failure indication for the unaligned transaction, and retry the unaligned transaction with either a different alignment or a different transfer size. The different alignment or the different transfer size is used for another unaligned transaction from a same address range upon successful retry of the unaligned transaction.

In one embodiment, a data storage device includes a memory device and a controller coupled to the memory device. The controller is configured to issue an unaligned transaction, determine that there is a transfer failure indication for the unaligned transaction, and retry the unaligned transaction with either a different alignment or a different transfer size.

In another embodiment, a data storage device includes a memory device and a controller coupled to the memory device. The controller includes a host interface module, where the host interface module includes a host address grouping table and alignment logic, a command scheduler, one or more processors, and a flash interface module.

In another embodiment, a data storage device includes memory means and a controller coupled to the memory means. The controller is configured to determine that an issued transaction is unaligned, adjust either an alignment or a transfer size of the issued transaction, determine if the adjusting is successful, and process the adjusted issued transaction upon determining that the adjusting is successful.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, aligning unaligned transactions. A data storage device includes a memory device and a controller coupled to the memory device. The controller is configured to issue an unaligned transaction, determine that there is a transfer failure indication for the unaligned transaction, and retry the unaligned transaction with either a different alignment or a different transfer size. The different alignment or the different transfer size is used for another unaligned transaction from a same address range upon successful retry of the unaligned transaction.

Figure 1:
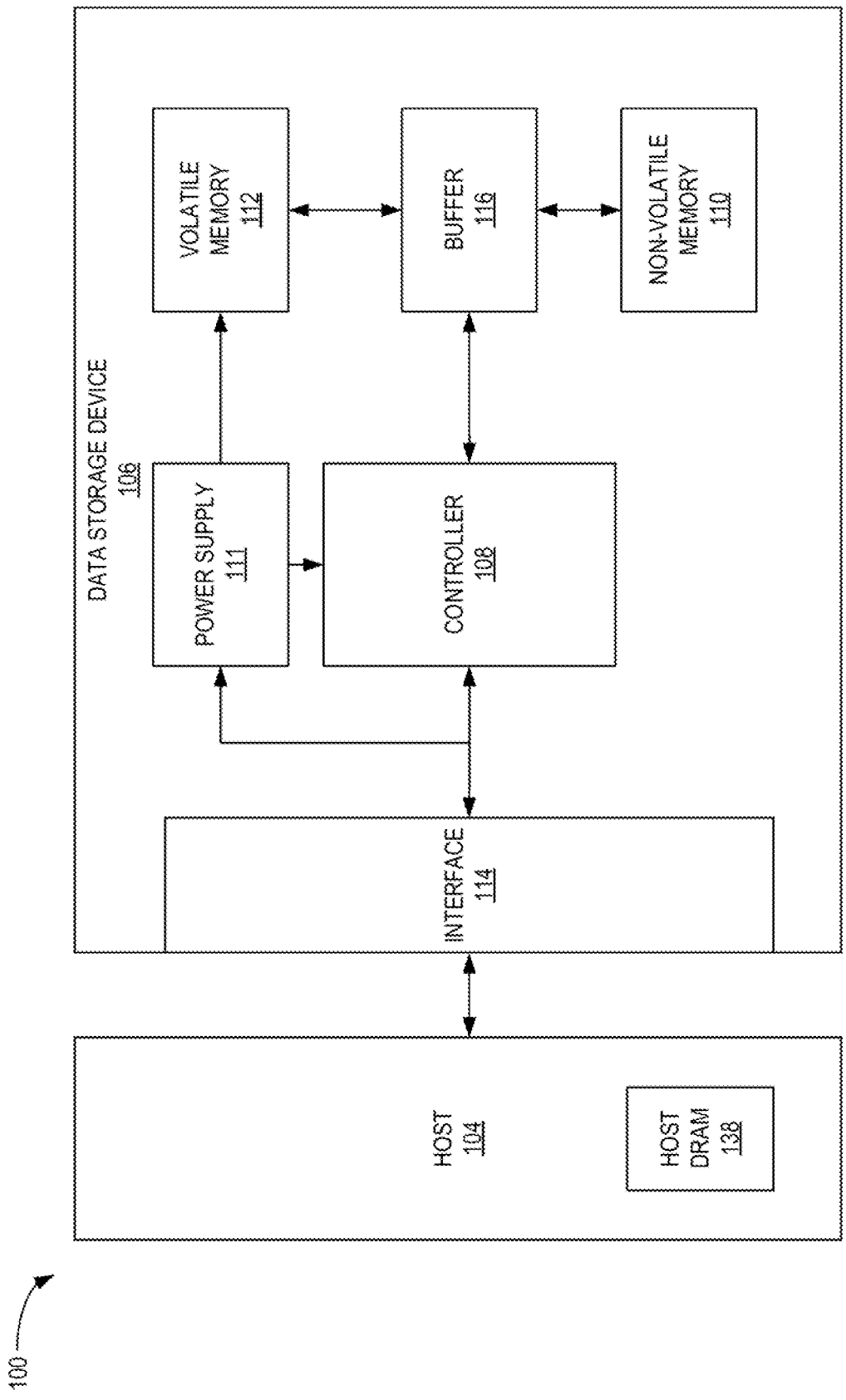
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
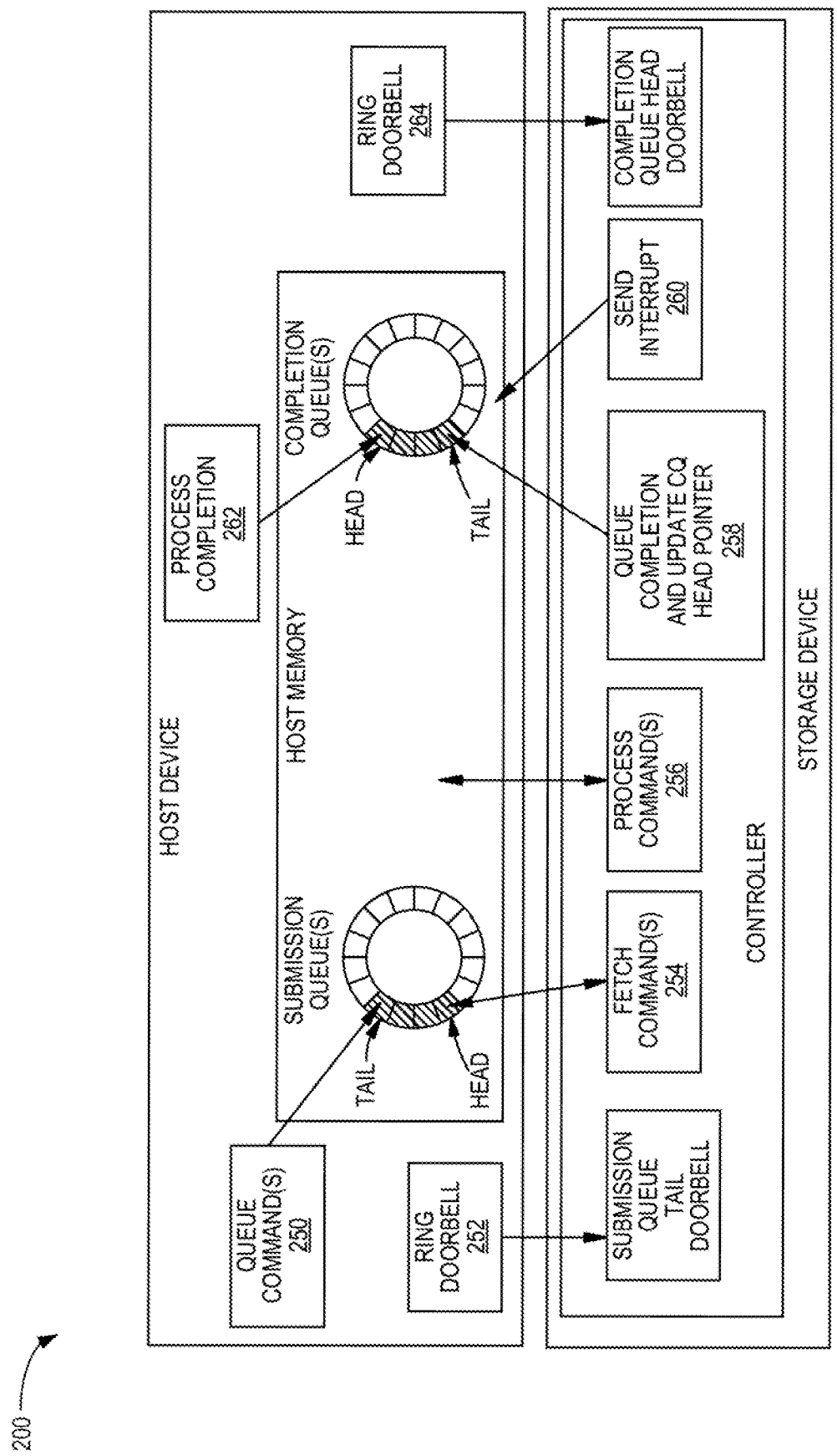
FIG. 2 is a block diagram illustrating a method of operating a storage device to execute a read or write command, according to certain embodiments.

FIG. 2 is a block diagram illustrating a method 200 of operating a storage device to execute a read or write command, according to one embodiment. Method 200 may be used with the storage system 100 having a host device 104 and a storage device 106 comprising a controller 108.

Method 200 begins at operation 250, where the host device writes a command into a submission queue (SQ) as an entry. The host device may write one or more commands into the submission queue at operation 250. The commands may be read commands or write commands. The host device may comprise one or more submission queues.

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
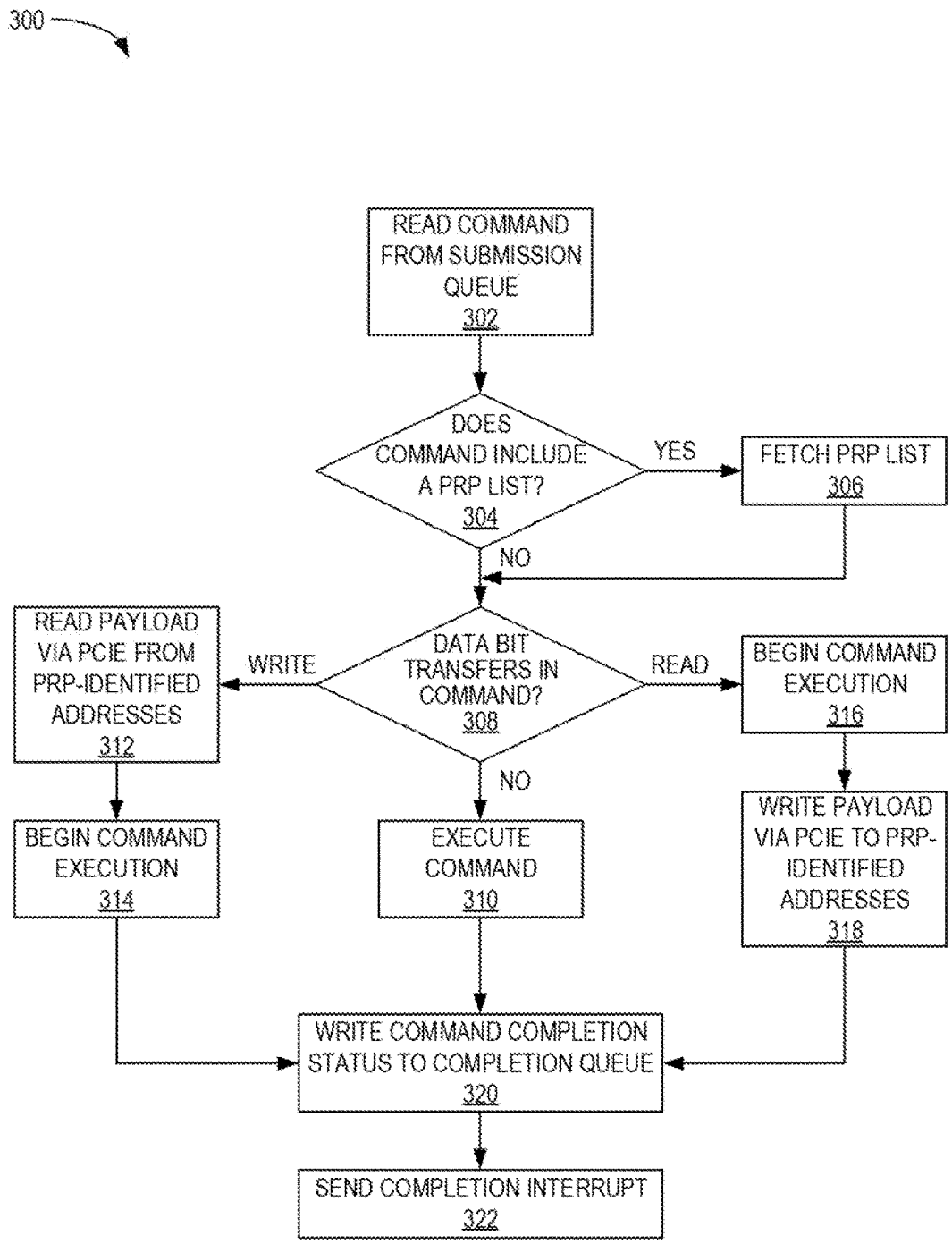
FIG. 3 is a flow diagram illustrating a method of operating a storage device to execute a read or write command, according to certain embodiments.

FIG. 3 is a flow diagram illustrating a method 300 of operating a storage device to execute a read or write command, according to certain embodiments. Method 300 may describe method 200 of FIG. 2. Aspects of the storage system 100 of FIG. 1 may be referenced herein for exemplary purposes. At block 302, the controller 108 reads a command from a submission queue of the host device 104. At block 304, the controller 108 determines if the command includes a physical region page (PRP) list, which may indicate a physical location in the host device 104 memory to retrieve data from. If the controller 108 determines that the command includes the PRP list at block 304, then the controller 108 fetches the PRP list at block 306. However, if the controller 108 determines that the command does not include the PRP list at block 304 or after the PRP list is fetched at block 306, then the controller 108 determines if there are data bit transfers in the command at block 308.

If there are write data bit transfers at block 308, then the controller 108 reads the payload via PCIe from the PRP list identified addresses at block 312. At block 314, the controller 108 begins command execution. If there are read data bit transfers at block 308, then the controller 108 begins executing the command at block 316. At block 318, the controller 108 writes the payload via PCIe to the PRP list identified addresses at block 318. If there are no data bit transfers (i.e., no write data bit transfers or read data bit transfers) at block 308, then the controller 108 executes the command at block 310. At block 320, the controller 108 writes a command completion status to the CQ of the host device 104. At block 322, the controller 108 sends a completion interrupt to the host device 104.

Figure 4:
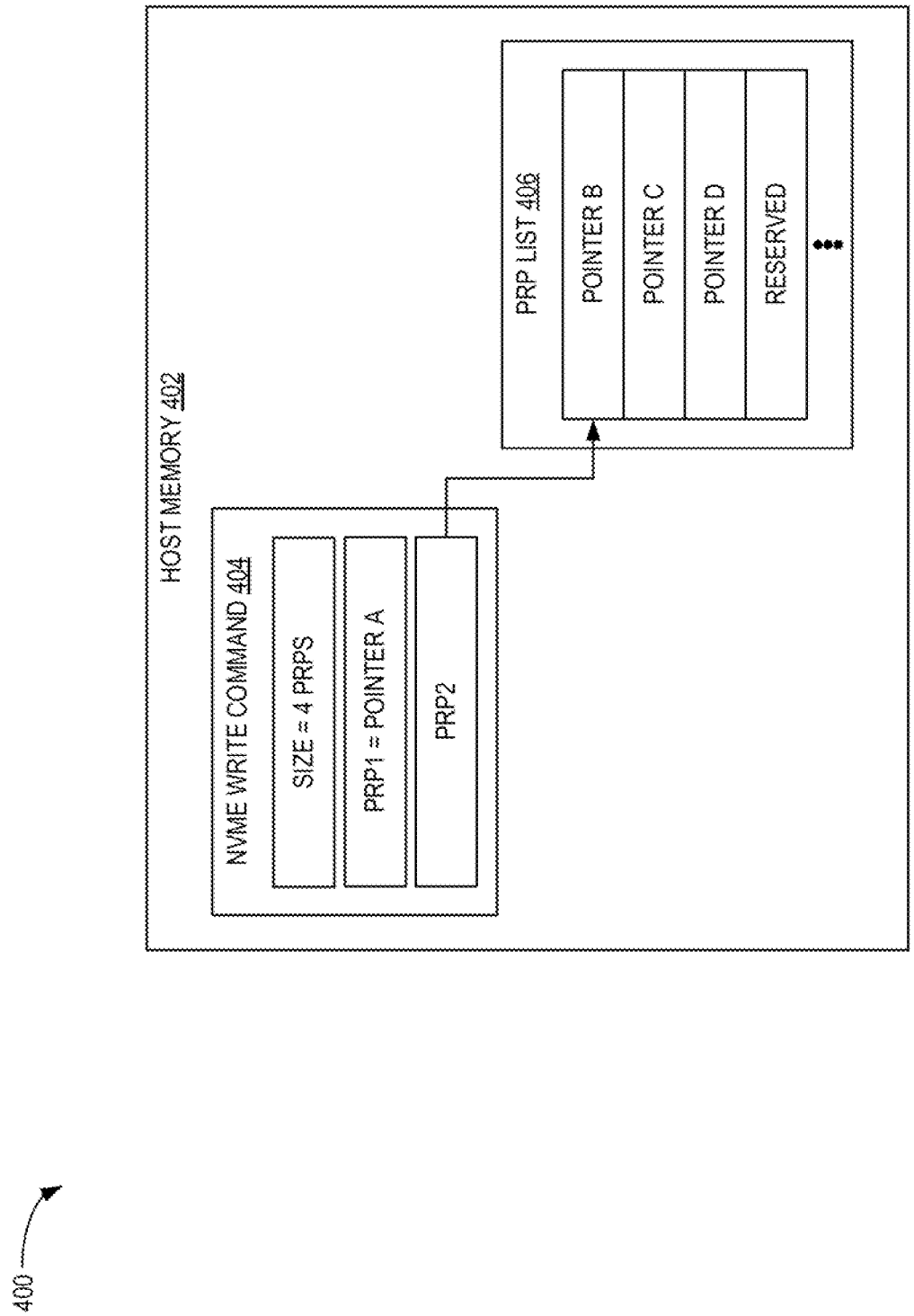
FIG. 4 is a block diagram illustrating an unaligned transaction in NVMe while fetching PRPs, according to certain embodiments.

FIG. 4 is a block diagram 400 illustrating an unaligned transaction in NVMe while fetching PRPs, according to certain embodiments. Examples of access alignments and access sizes are shown below in Table 1. The listed values are not intended to be limiting, but to provide an example of a possible embodiments.

TABLE 1

| Command Phase | Size (or Multiplier) | Alignment |
| --- | --- | --- |
| Command Fetch | 64 Bytes | 64 Bytes |
| PRP Entry Fetch | 8 Bytes | 8 Bytes |
| Payload (Admin Command) | Varies | DWORD |
| Payload (I/O Command) | LBA size (512 Bytes or 4096 Bytes) | DWORD |
| HMB | DWORD (4 Bytes) | 4 Bytes |

Access alignment is determined by the host device 104, but may not always be optimal for the target memory location since NVMe and PCIe operates at different layers of the protocol stack. As such, the requested size and alignment of a specific command payload may not be supported by or ideal for the host device, which may result in failures and/or performance loss.

For example, a first address in a PRP list may be misaligned in the host device 104 memory, causing all subsequent transfers to also be misaligned. Alternatively, HMB accesses may fetch a specific L2P entry or a cache line of related entries, which may not be aligned to an ideal size and alignment for that memory area or root complex. In another example, the data storage device 106 may optimally request a transaction of a transfer layer packet (TLP) size smaller than the maximum TLP size defined for the data storage device 106, which may result in a latency impact for larger transfers. The TLP size is a size that is broadcasted to the host device 104 from the data storage device 106 for an optimal transfer data size.

A host memory 402 may be the host DRAM 138 of the host device 104 of FIG. 1. When the host device 104 issues an NVMe write command 404, a controller 108 retrieves the NVMe write command from the host memory 402. It is to be understood that the embodiments described may also apply to protocols other that PCIe and NVMe. The NVMe write command 404 includes a size (size=4 PRPs), a first PRP pointer (PRP1=Pointer A), and a second PRP pointer (PRP2) pointing to a PRP list 406. The PRP list 406 includes a plurality of pointers (e.g., Pointer B, Pointer C, Pointer D, reserved), where the NVMe write command 404 references Pointer B, Pointer C, and Pointer D as indicated by the size equaling 4 PRPs and a second PRP pointer pointing to Pointer B of the PRP list 406. Because only one PRP is referenced in the NVMe write command 404, the remaining three PRP pointers are retrieved from the PRP list 406.

The transfer size for the command is 16 KB, which requires four host pointers. Each pointer has a size of 8 bytes. The first pointer (PRP1=Pointer A) is located in the command. However, the other three pointers (Pointer B, Pointer C, and Pointer D) are located in the PRP list 406, where Pointer B is pointed to by PRP2. PRP2 may be a field in the command. In order to read Pointer B, Pointer C, and Pointer D, the controller 108 needs to issue a read request in a size corresponding to the TLP size. Therefore, in order to fetch Pointer B, Pointer C, and Pointer D, the controller 108 needs to issue a transaction request of a size of 24 bytes. The transaction request of size 24 bytes may be considered an unaligned transaction since the request is aligned to 8 bytes.

In one example, a failure by the host device 104 for a particular TLP may cause the controller 108 to issue a retry with a different alignment or transfer size. Once access to a particular memory range, which has previously failed, succeeds with a new configuration (i.e., a changed alignment or changed transfer size), the new configuration will be stored in the controller 108 for that range and reused for future accesses to the range. Therefore, in order to fetch Pointer B, Pointer C, and Pointer D, in an aligned manner, the controller 108 may issue a request in a size of 32 bytes. The request is aligned to 16 bytes and the last 8 bytes are dropped by data storage device. It is to be understood that dropped may also refer to ignored.

For example, if a read with a TLP size of 512 bytes and an alignment of 4 bytes returns a transfer failure indication, the TLP may be retried with a size of 256 bytes or a different alignment. Once the TLP is acknowledged successfully by the host device 104, future reads from the same address range (at a predefined granularity) may continue to use the successful TLP size/alignment.

Figure 5:
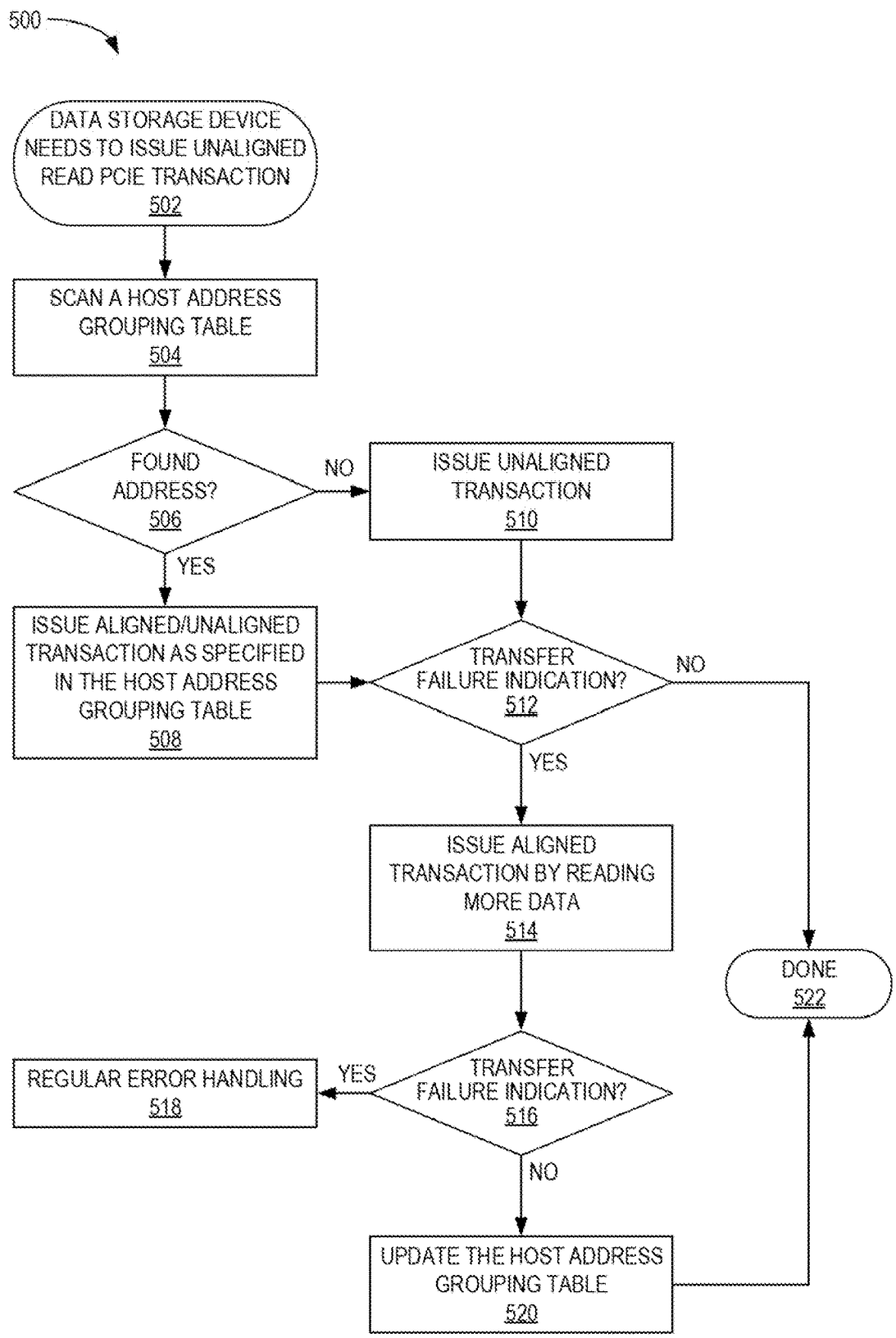
FIG. 5 is a flow diagram illustrating a method of alignment of unaligned transactions, according to certain embodiments.

FIG. 5 is a flow diagram illustrating a method 500 of alignment of unaligned transactions, according to certain embodiments. Method 500 may be implemented by a controller, such as the controller 108 of FIG. 1. Aspects of the storage system 100 of FIG. 1 may be referenced herein for exemplary purposes. At block 502, the controller 108 needs to issue an unaligned read PCIe transaction. At block 504, the controller 108 scans a host address grouping table. The host address grouping table stores a database of alignment and transfer size for previous successful retries associated with different address ranges. At block 506, the controller 108 determines if the address range associated with the unaligned read PCIe transaction is found in the host address grouping table.

If the address range associated with the unaligned read PCIe transaction is found in the host address grouping table at block 506, then the controller 108 issues an aligned or unaligned transaction as specified in the host address grouping table at block 508. The transaction may not be aligned due to the alignment changing. However, if the address range associated with the unaligned read PCIe transaction is not found in the host address grouping table at block 506, then the controller 108 issues an unaligned transaction at block 510. At block 512, the controller 108 determines if there is a transfer failure indication for the transaction issued at either block 508 or block 510.

If there is not a transfer failure indication at block 512, then method 500 is completed at block 522. However, if there is a transfer failure indication at block 512, then the controller 108 issues an aligned transaction by reading more data at block 514. The issuing of an aligned transaction may include determining an amount of data needed to re-align the unaligned transaction. The re-aligning may include changing either an alignment, a transfer size, or both an alignment and an transfer size. At block 516, the controller 108 determines if there is a transfer failure indication for the transaction issued at block 514. If there is a transfer failure indication at block 514, then the controller 108 executes error handling for the unaligned transaction at block 518. However, if there is not a transfer failure indication at block 516, then the controller 108 updates the host address grouping table with the updated successful alignment, transfer size, or alignment and transfer size for the address range. Method 500 is completed at block 522.

Figure 6:
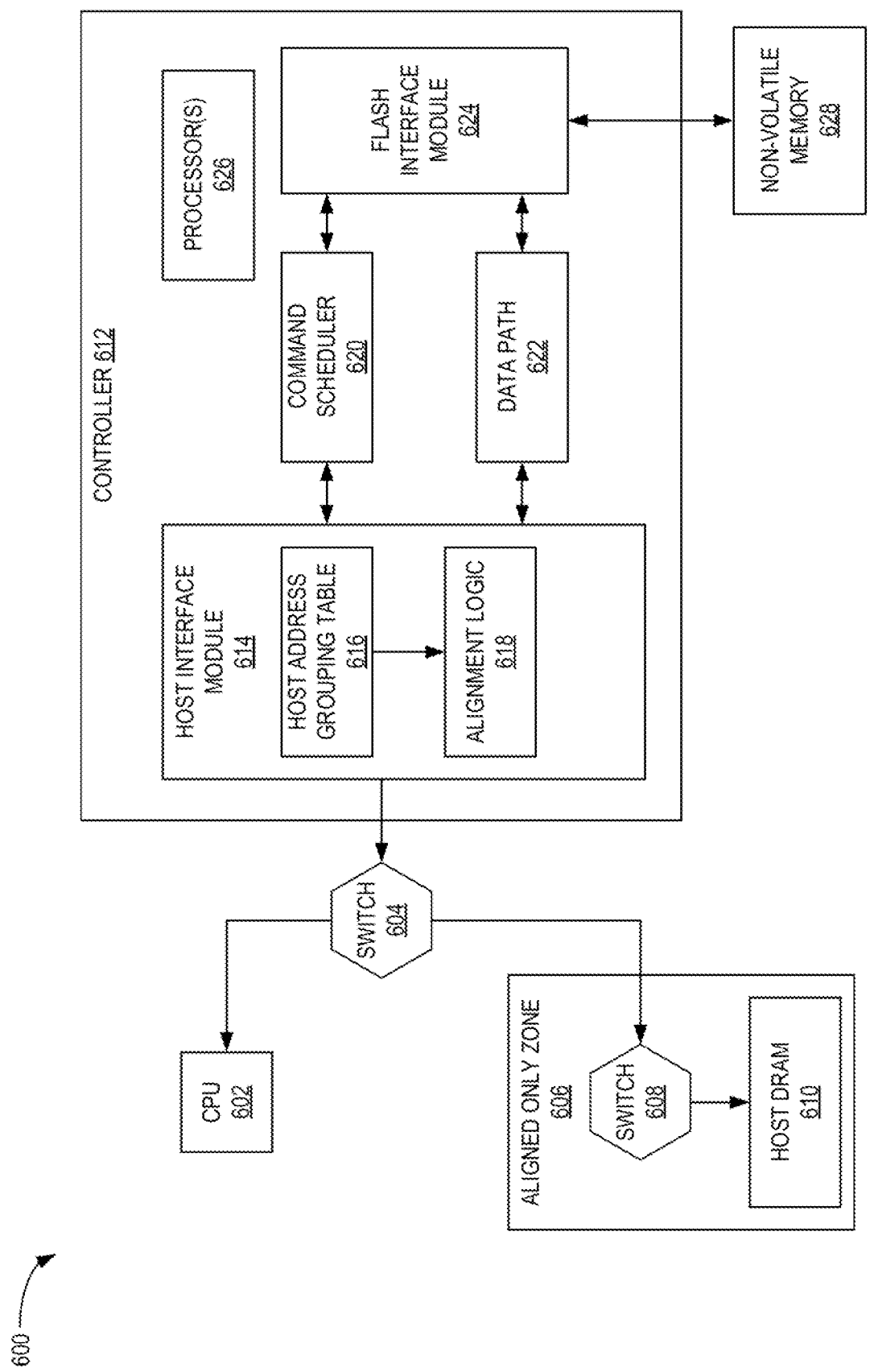
FIG. 6 is a schematic block diagram illustrating a storage system in which unaligned transactions may be aligned, according to certain embodiments.

FIG. 6 is a schematic block diagram illustrating a storage system 600 in which unaligned transactions may be aligned, according to certain embodiments. A controller 612 may implement method 500 of FIG. 5, where the host address grouping table may be a host address grouping table 616. The storage system 600 includes a CPU 602, which may be part of a host device, such as the host device 104. The host device 104 includes a PCIe switch 604 to differentiate between input/output (I/O) transfers to the control paths (e.g., interrupts and messages). The control messages may be directed to the CPU 602, where unaligned transfers may issue. However, in the I/O path, aligned transactions may be accepted and unaligned transactions are rejected. The host device 104 includes an aligned only zone 606, which includes a switch 608 coupled to a host DRAM 610 for retrieving data and aligned transactions.

The controller 612 includes a host interface module 614, a command scheduler 620, a data path 622, a flash interface module 624, and one or more processors 626. The controller 612 may be operable in PCIe protocol. The controller 612 may also be operable in CXL protocol. It is to be understood that other protocols not listed may be applicable to the described embodiments. The host interface module 614 includes the host address grouping table 616 and an alignment logic 618. The alignment logic 618 may implement method 500 of FIG. 5. The alignment logic 618 manages the host address grouping table 616. The flash interface module 624 is coupled to the NVM 628, where data is read from and programmed to the NVM 628 by the controller 612. The data path 622 may include encoders/decoders, encryption/decryption engines, direct memory accesses, and the like. The command scheduler 620 may generate commands for NVM 110 accesses to read data from and program data to the NVM 110 based on the commands received from the host device 104.

By changing an alignment and/or a transfer size associated with an unaligned transaction, future unaligned transactions for a same address range may be aligned using a host address grouping table. Thus, the performance of the data storage device may be improved.

In one embodiment, a data storage device includes a memory device and a controller coupled to the memory device. The controller is configured to issue an unaligned transaction, determine that there is a transfer failure indication for the unaligned transaction, and retry the unaligned transaction with either a different alignment or a different transfer size.

The controller is further configure to use the different alignment or the different transfer size for another unaligned transaction from a same address range upon successful retry of the unaligned transaction. The controller is further configured to scan a host address grouping table before issuing the unaligned transaction. The controller is further configured to determine that there is an entry corresponding to the unaligned transaction in the host address grouping table. The controller is further configured to, when the entry corresponding to the unaligned transaction is present, either issue an aligned transaction or issue an unaligned transaction. The issued transaction is issued as specified in the host address grouping table. The controller is further configured to, when the entry corresponding to the unaligned transaction is not present, issue an unaligned transaction. The controller is further configured to determine that there is a second transfer failure indication for the unaligned transaction with either the different alignment or the different transfer size. The controller is further configured to execute error correction function on the unaligned transaction. The controller is further configured to determine that there is not a second transfer failure indication for the unaligned transaction with either the different alignment or the different transfer size. The controller is further configured to update a host address grouping table with the different alignment or the different transfer size for a same address. The controller is further configured to process the unaligned transaction with the different alignment or the different transfer size.

In another embodiment, a data storage device includes a memory device and a controller coupled to the memory device. The controller includes a host interface module, where the host interface module includes a host address grouping table and alignment logic, a command scheduler, one or more processors, and a flash interface module.

The host address grouping table comprises one or more entries. Each entry of the one or more entries corresponds to an alignment or a transfer size for an unaligned transaction. The controller is operable according to CXL protocol. The alignment logic determines a different alignment or a different transfer size for an unaligned transaction. The controller is configured to access the host address grouping table upon determining that either a first address in a physical region page (PRP) list is misaligned, a fetched logical to physical (L2P) entry or cache line from an host memory buffer is misaligned, or an issued transaction is less than a maximum transfer layer packet (TLP) size.

In another embodiment, a data storage device includes memory means and a controller coupled to the memory means. The controller is configured to determine that an issued transaction is unaligned, adjust either an alignment or a transfer size of the issued transaction, determine if the adjusting is successful, and process the adjusted issued transaction upon determining that the adjusting is successful.

The controller is further configured to check a host address grouping table upon determining that the issued transaction is unaligned and update the host address grouping table based on determining that the adjusting is successful. The controller is further configured to check the issued transaction for a transfer failure indication two or more times.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
issue an unaligned transaction;
determine that there is a transfer failure indication for the unaligned transaction; and
retry the unaligned transaction with either a different alignment or a different transfer size, wherein the controller is further configure to use the different alignment or the different transfer size for another unaligned transaction from a same address range upon successful retry of the unaligned transaction.

2. The data storage device of claim 1, wherein the controller is further configured to scan a host address grouping table before issuing the unaligned transaction.

3. The data storage device of claim 2, wherein the controller is further configured to determine that there is an entry corresponding to the unaligned transaction in the host address grouping table.

4. The data storage device of claim 3, wherein the controller is further configured to, when the entry corresponding to the unaligned transaction is present, either:
issue an aligned transaction; or
issue an unaligned transaction.

5. The data storage device of claim 4, wherein the issued transaction is issued as specified in the host address grouping table.

6. The data storage device of claim 3, wherein the controller is further configured to, when the entry corresponding to the unaligned transaction is not present, issue an unaligned transaction.

7. The data storage device of claim 1, wherein the controller is further configured to determine that there is a second transfer failure indication for the unaligned transaction with either the different alignment or the different transfer size.

8. The data storage device of claim 7, wherein the controller is further configured to execute error correction function on the unaligned transaction.

9. The data storage device of claim 1, wherein the controller is further configured to determine that there is not a second transfer failure indication for the unaligned transaction with either the different alignment or the different transfer size.

10. The data storage device of claim 9, wherein the controller is further configured to update a host address grouping table with the different alignment or the different transfer size for a same address.

11. The data storage device of claim 10, wherein the controller is further configured to process the unaligned transaction with the different alignment or the different transfer size.

12. The data storage device of claim 1,
wherein the controller comprises:
 a host interface module, wherein the host interface module comprises a host address grouping table and alignment logic;
 a command scheduler;
 one or more processors; and
 a flash interface module.

13. The data storage device of claim 12, wherein the host address grouping table comprises one or more entries, and wherein each entry of the one or more entries corresponds to an alignment or a transfer size for an unaligned transaction.

14. The data storage device of claim 12, wherein the controller is operable according to CXL protocol.

15. The data storage device of claim 12, wherein the alignment logic determines a different alignment or a different transfer size for an unaligned transaction.

16. The data storage device of claim 12, wherein the controller is configured to access the host address grouping table upon determining that either:
 a first address in a physical region page (PRP) list is misaligned;
 a fetched logical to physical (L2P) entry or cache line from an host memory buffer is misaligned; or
 an issued transaction is less than a maximum transfer layer packet (TLP) size.

17. The data storage device of claim 1,
wherein the controller is further configured to:
 determine that an issued transaction is unaligned;
 adjust either an alignment or a transfer size of the issued transaction;
 determine if the adjusting is successful; and
 process the adjusted issued transaction upon determining that the adjusting is successful.

18. The data storage device of claim 17, wherein the controller is further configured to:
 check a host address grouping table upon determining that the issued transaction is unaligned; and
 update the host address grouping table based on determining that the adjusting is successful.

19. The data storage device of claim 17, wherein the controller is further configured to check the issued transaction for a transfer failure indication two or more times.

20. The data storage device of claim 1, wherein the controller is configured to issue an aligned transaction by reading more data.

* * * * *